United States Patent
Maumus et al.

(10) Patent No.: US 6,830,718 B2
(45) Date of Patent: Dec. 14, 2004

(54) METHOD OF MANUFACTURING HONEYCOMB STRUCTURES

(75) Inventors: Jean Pierre Maumus, St Medard en Jalles (FR); Claude Grondin, St Medard en Jalles (FR)

(73) Assignee: Snecma Moteurs, Paris (FR)

( * ) Notice: Subject to any disclaimer, the term of this patent is extended or adjusted under 35 U.S.C. 154(b) by 281 days.

(21) Appl. No.: 10/029,534

(22) Filed: Dec. 21, 2001

(65) Prior Publication Data

US 2002/0092150 A1 Jul. 18, 2002

(30) Foreign Application Priority Data

Dec. 26, 2000 (FR) .............................................. 00 17016

(51) Int. Cl.[7] .......................... B32B 3/12; B29C 70/44
(52) U.S. Cl. ...................... 264/82; 264/154; 264/156; 264/257; 264/258; 264/314; 264/317; 264/324; 156/197; 156/211; 156/229; 156/245; 156/250
(58) Field of Search ................................ 264/257, 258, 264/313, 314, 317, 324, 82; 156/245, 197, 211, 229, 250

(56) References Cited

U.S. PATENT DOCUMENTS

| | | | | |
|---|---|---|---|---|
| 3,704,194 A | * | 11/1972 | Harrier ....................... 156/245 |
| 3,787,546 A | * | 1/1974 | Pratt et al. .................... 264/156 |
| 4,696,711 A | * | 9/1987 | Greszczuk ................... 156/173 |
| 5,039,296 A | * | 8/1991 | Buhler et al. ................ 425/356 |
| 5,514,445 A | * | 5/1996 | Delage et al. ............... 428/116 |
| 6,264,868 B1 | * | 7/2001 | Marchant ..................... 264/221 |
| 6,290,889 B1 | * | 9/2001 | Castanie et al. ............. 264/219 |
| 6,451,241 B1 | * | 9/2002 | Ohliger et al. .............. 264/510 |

FOREIGN PATENT DOCUMENTS

| | | |
|---|---|---|
| FR | 2 691 923 | 12/1993 |
| GB | 2 242 389 | 10/1991 |

* cited by examiner

Primary Examiner—Stefan Staicovici
(74) Attorney, Agent, or Firm—Weingarten, Schurgin, Gagnebin & Lebovici LLP

(57) ABSTRACT

A method of manufacturing a honeycomb structure, the method comprising the steps of forming staggered cells through the entire thickness of a fiber fabric, causing loosely held pegs to penetrate into respective ones of the cells, each peg having a cross-section of size smaller than that of the corresponding cell and being made of a material that is suitable for expanding; expanding the pegs so that they fill the cells and exert pressure on the inside faces of the cells; and shrinking the pegs and then withdrawing them.

13 Claims, 5 Drawing Sheets

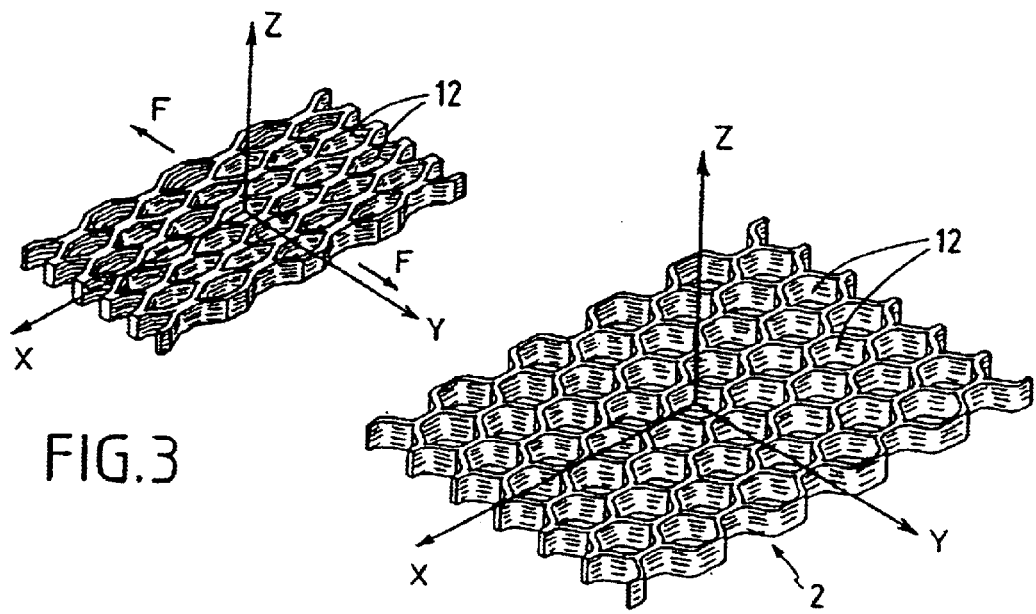
FIG.3
FIG.4
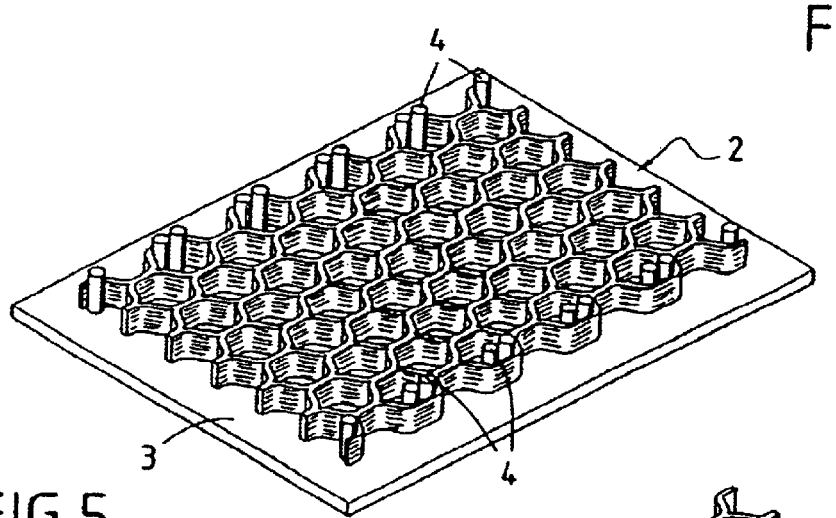
FIG.5
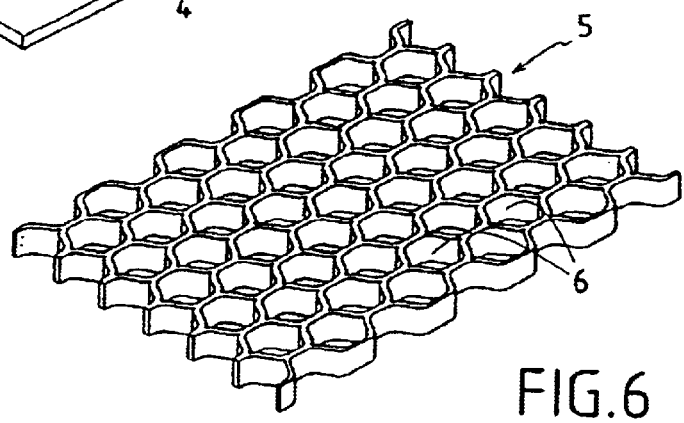
FIG.6
PRIOR ART

METHOD OF MANUFACTURING HONEYCOMB STRUCTURES

FIELD OF THE INVENTION

The present invention relates to manufacturing honeycomb structures, and more particularly honeycomb structures made of composite material. The invention also relates to tooling suitable for this purpose.

Honeycomb structures, in particular those made of composite material, are advantageous in that they generally present good mechanical properties, while being light in weight. They can be used, for example, as furnace bottoms.

DESCRIPTION OF THE PRIOR ART

Several methods exist for manufacturing honeycomb structures out of composite material.

One such method is shown in FIGS. 1 to 6 and comprises a three-dimensional reinforcing fabric of carbon fibers 1 which is prepared by stacking carbon fiber plies 10 and binding them together by needling, stitching, or any other analogous technique (FIG. 1).

Cuts 11 in the form of parallel slits placed in a staggered configuration are made through the fiber fabric 1 perpendicularly to the XY planes of the plies 10, e.g. by means of a knife or by using a water jet (FIG. 2).

The fabric is then stretched in a Y direction perpendicular to the XZ planes of the cuts, as shown by arrows F in FIG. 3 so as to form cells 12. This provides a fiber preform constituting a honeycomb 2 (FIG. 4).

The preform 2 is held in the stretched position by means of tooling constituted by a graphite bottom plate 3 and graphite studs 4 received in the cells along opposite edges of the preform (that are opposite in the Y direction, see FIG. 5). The assembly constituted by the expanded preform 2 and the tooling 3, 4 is then placed in a furnace where the preform 2 is densified with carbon by chemical vapor infiltration (CVI). In well-known manner, densification serves to fill the pores in the preform. At the end of the densification stage, a honeycomb structure 5 of composite material is obtained (FIG. 6).

Such a method is described in detail in French patent application No. FR-A-2 691 923.

In practice, it has been found that the inside faces of the cells obtained in this way (cf. reference 6 in FIG. 6) are not perfectly smooth, and often present surface defects such as roughness which can lead to injury while the structure is being handled. To resolve this problem it is possible to machine said inside faces so as to eliminate the defects. Nevertheless such an operation is very awkward.

Another drawback of the above-mentioned method lies in the fact that the cells in the final product are not always entirely regular in shape, i.e. in particular the cells are not all of the same shape, which is not only harmful to overall appearance, but can also reduce the strength of the structure.

OBJECT AND SUMMARY OF THE INVENTION

The present invention seeks to remedy the above-mentioned drawbacks.

To this end, the invention provides a method of manufacturing a honeycomb structure, the method comprising the steps of:

forming staggered cells through the entire thickness of a fiber fabric;

causing pegs to penetrate into respective ones of the cells, each peg having a cross-section of size smaller than that of the corresponding cell and being made of a material that is suitable for expanding;

expanding the pegs so that they fill the cells and exert pressure on the inside faces of the cells; and shrinking the pegs and then withdrawing them.

When the pegs are said to be "caused to penetrate" into the cells and when they are said to be "withdrawn" from the cells, these terms refer to relative movement between the pegs and the cells. Such operations can be implemented by moving the fiber fabric relative to the pegs which are held stationary, or on the contrary by moving the pegs while the fiber fabric remains stationary.

The pressure exerted by the expanding pegs against the inside faces of the cells eliminates the roughness initially present on said inside faces. It also enables the cells to take the shape of the pegs, thereby conferring a regular shape thereto.

Typically, the pegs are mounted on a plate, preferably loosely, thereby enabling them to move relative thereto, and they extend substantially perpendicularly to the plate.

The pegs can be expanded by heating them, e.g. by heating the assembly constituted by the plate, the pegs, and the fiber fabric in an oven.

The pegs can be made of a material comprising silicone or metal. If they are made of metal, the pegs are preferably coated with an anti-adhesive layer so as to make it easier for them to slide in the cells of the fiber fabric.

In a variant, the pegs can consist of inflatable bladders, with the pegs being expanded by injecting gas under pressure into each of said bladders, and with the pegs being shrunk by deflating said bladders.

In yet another variant, the pegs can consist in inflatable bladders each containing a gas, and the pegs are expanded in the same manner as for pegs made of silicone or of metal, i.e. by thermal expansion. More particularly, by heating the assembly constituted by the plate, the pegs, and the fabric, the gas(es) contained in the bladders expand(s) to inflate the bladders.

Preferably, the method of the invention further comprises, prior to the step of expanding the pegs, a step which consists in applying a backing plate having through holes in positions that correspond with the cells and the pegs, the backing plate being placed against the fiber fabric so as to hold said fiber fabric against the plate.

Advantageously, the method of the invention also comprises a step consisting in impregnating the fiber fabric with resin, which step is preferably implemented prior to forming the cells in the fiber fabric. The resin serves to consolidate the fiber fabric so as to hold the cells open, or in other words so as to hold the cellular fiber fabric in a stretched condition.

The resin can then be cured. Advantageously, when the pegs are expanded by heating, a single heating operation is performed both for expanding the pegs and for curing the resin.

A step can also be provided, after the pegs have been shrunk and withdrawn, for the purpose of densifying the fiber fabric.

The present invention also provides tooling for implementing the above-defined method, the tooling comprising a plate and pegs mounted in a staggered configuration on the plate, substantially perpendicularly thereto, and made of a material that is suitable for expanding and preferably possessing a high coefficient of expansion.

BRIEF DESCRIPTION OF THE DRAWINGS

In the accompanying drawings:

FIGS. 1 to 6 show a prior art method of manufacturing a honeycomb structure out of composite material;

DESCRIPTION OF VARIOUS EMBODIMENTS OF THE INVENTION

A method of the invention for manufacturing a honeycomb preform and for manufacturing a composite material honeycomb structure from said preform is described below with reference to the accompanying drawings.

Figures 1, 2:
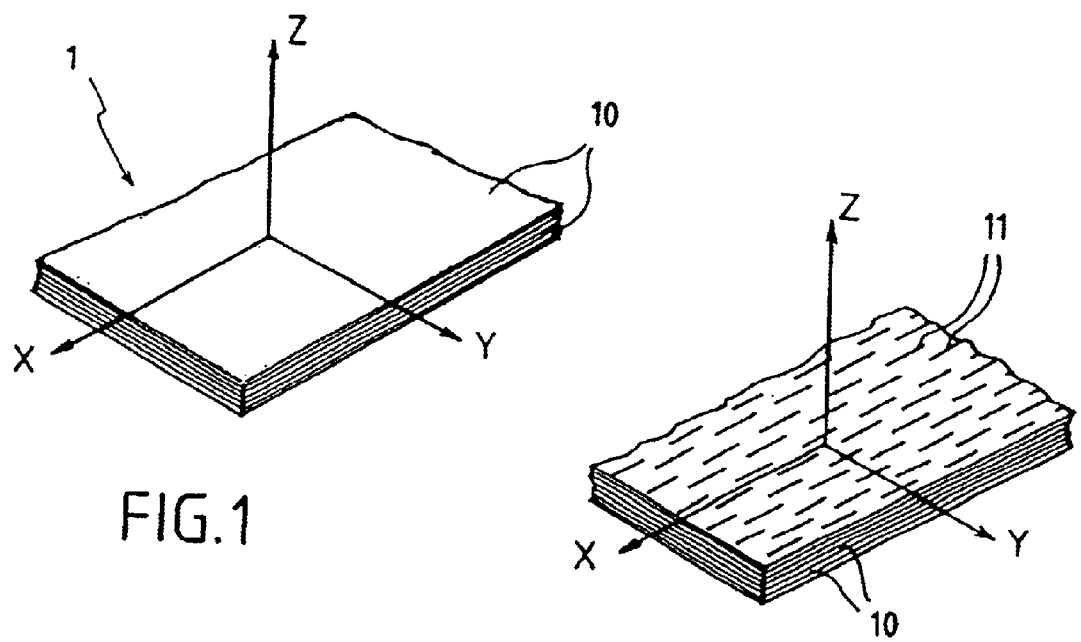

In a first step of the method, a preform consisting of a fiber fabric of the same type as that shown in FIG. 1 is prepared, e.g. by stacking plies of carbon fiber cloth and by binding them together by needling, stitching, or any other analogous technique.

The fiber fabric is then impregnated in a resin, such as a phenolic resin.

In a following step, parallel cuts are made in a staggered configuration all through the resin-impregnated fiber fabric, preferably perpendicularly to the plies, in a manner comparable to the method described in French patent application No. FR-A-2 691 923, and as shown in FIG. 2.

Thereafter, the fabric is stretched in a direction parallel to the plies, as shown in FIG. 3, so as to form cells in the positions that correspond to the cuts.

Figure 7:
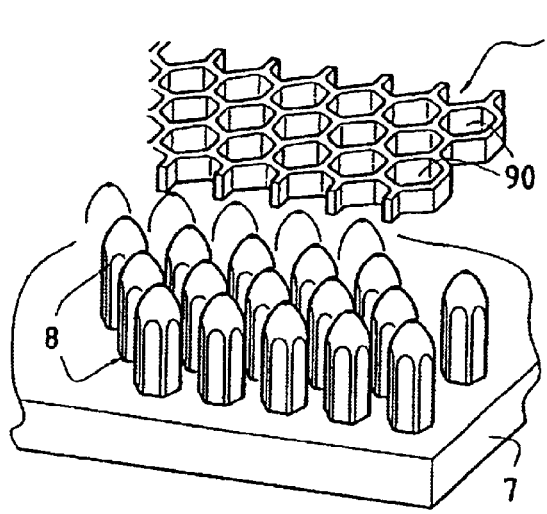
FIGS. 7 and 8 show tooling for manufacturing a honeycomb structure in a first embodiment of the invention.

The resulting fabric, referenced 9 in FIG. 7, differs from the fabric 2 shown in FIG. 4 essentially in that it is impregnated in resin.

The presence of the resin makes it possible to consolidate the fabric, and to keep it in the stretched condition without it being necessary to have recourse to the prior art graphite tooling 3, 4.

In the invention, special tooling is used firstly to smooth the inside faces of the cells and secondly to impart a regular shape to the cells.

This special tooling comprises, in a first embodiment, a metal support plate 7 and pegs 8 projecting upwards from the support plate 7 (cf. FIG. 7). There are at least as many pegs 8 as there are cells (where the cells are referenced 90) in the deployed fabric 9, and the pegs are mounted on the support plate 7 in positions which correspond to the positions of the cells 90.

Figure 8:
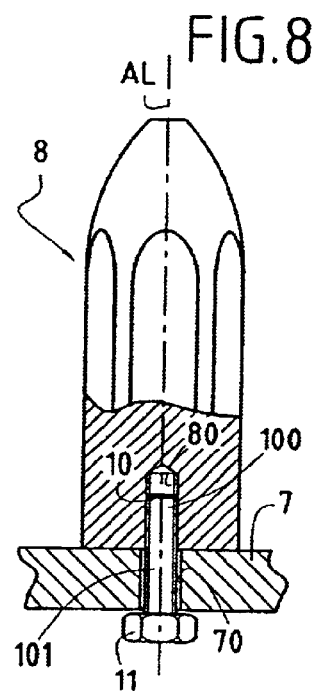

With reference to FIG. 8, the end of each peg 8 in contact with the support plate 7 is fixed to said plate by screw fastening, in particular by means of a threaded rod 10 attached to the peg 8. The threaded rod 10 has a first portion 100 received inside the peg and a second portion 101 projecting from the proximal end face of the peg. The projecting portion 101 of each threaded rod 10 passes through a corresponding bore 70 in the support plate 7 and its free end receives a nut 11 serving to hold the peg 8 against the top face of the support plate 7.

The bores 70 are preferably of diameter greater than the diameter of the threaded rods 10, and the nuts 11 are not tightened hard against the bottom face of the support plate 7 so that each peg 8 is fixed slightly loosely to the support plate 7, thereby enabling the peg to move a little both angularly and laterally relative to the support plate.

The pegs 8 are made of a material which is suitable for expanding, preferably a material which has a high coefficient of linear expansion, i.e. not less than about one part in 100,000 per kelvin ($10^{-5}$ K$^{-1}$), for example. It is also preferable for this material to possess anti-adhesive properties, for reasons which are explained below.

An example of a material which is suitable for the pegs 8 is silicone. Silicone is capable of expanding well under the effect of temperature. It also possesses the desired anti-adhesive properties. Each peg 8 can thus be made by molding silicone around the portion 100 of the corresponding threaded rod 10.

In a variant, the pegs 8 can be made metal. Under such circumstances, the pegs 8 are preferably coated with an outer anti-adhesive layer, e.g. of Teflon. The pegs 8 also comprise, in their proximal portions, tapped bores co-operating with the portions 100 of the corresponding threaded rods 10.

The pegs 8 are preferably hexagonal in shape being substantially identical to the shape of the cells 90. Nevertheless, they can have some other shape, e.g. they can be circular. In addition, the initial size of ambient temperature of their cross-section (i.e. perpendicular to their longitudinal axes AL as shown in FIG. 8) is less than that of the cross-section of the cells 90 (likewise perpendicular to the axes AL), while their height (along the axes AL) is greater than the thickness of the fabric 9.

Figure 9:
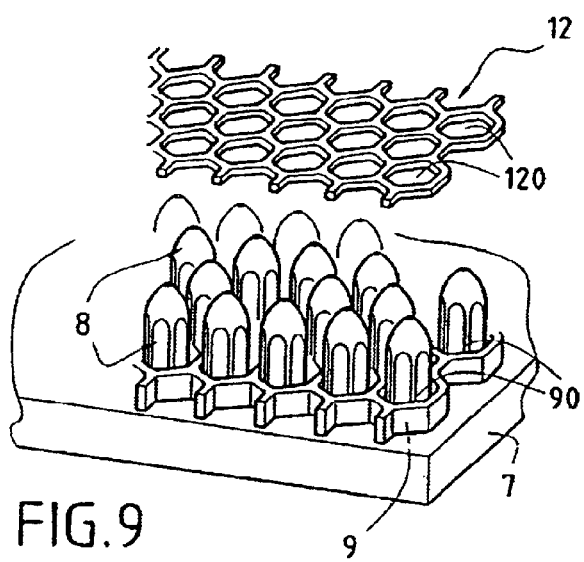
FIGS. 9 to 12 show steps in the manufacture of a honeycomb structure using the tooling of FIGS. 7 and 8.

The tooling 7, 9 of the invention is used as follows:

The resin-impregnated honeycomb fabric 9 is placed on the tooling in such a manner that the pegs 8 penetrate into the cells 90 (FIG. 9). Because of the difference in size between the cells 90 and the pegs 8, because the pegs 8 are mounted loosely on the support plate 7, and because of the anti-adhesive properties of the pegs 8, the pegs 8 can be inserted without difficulty into the cells 90.

A graphite backing plate 12 having through holes 120, e.g. of the same shape as the cells 90, and suitable for receiving the pegs 8, is then pressed against the top face of the fabric 9 so as to hold said fabric firmly against the support plate 7.

Figure 10:
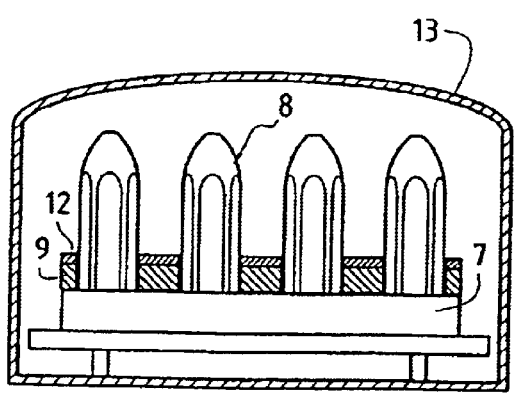

The assembly constituted by the tooling 7, 8, the fabric 9, and the backing plate 12 is then placed in an oven 13 where it is heated (FIG. 10). This heating operation seeks simultaneously to cure the resin impregnating the fabric 9 and to expand the pegs 8 so that they fill the cells 90 and press against the inside faces thereof. The pressure exerted by the pegs 8 eliminates the roughness which was previously present on the inside faces of the cells 90, and shapes the cells 90 so that they are all of the same shape which is identical to that of the pegs 8.

Figure 11:
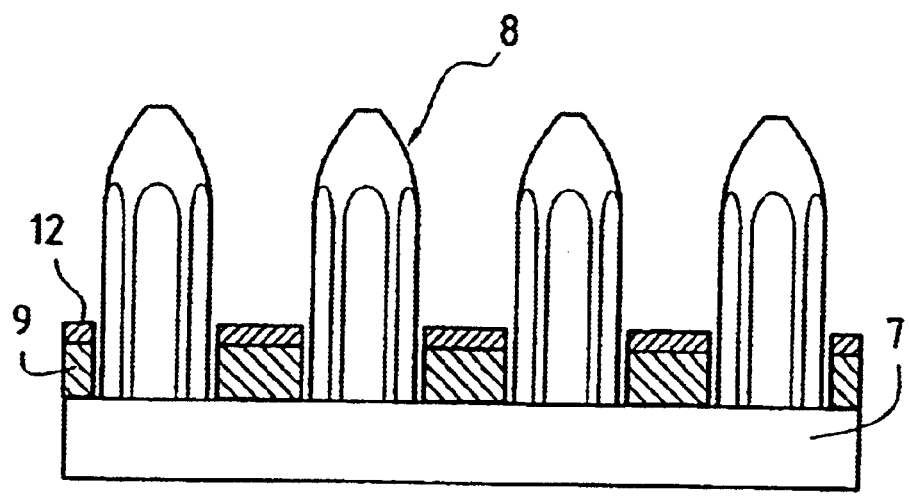
Figure 12:
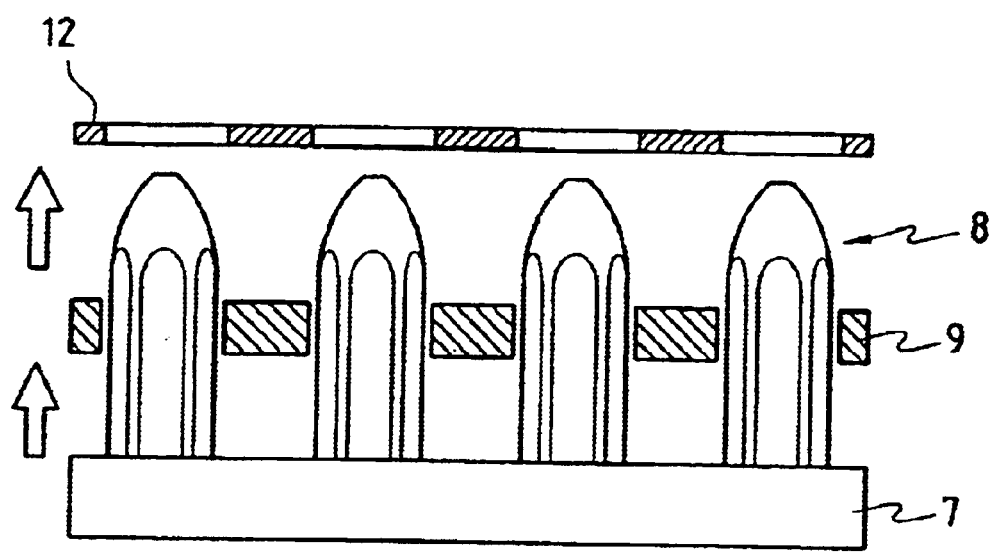

Once the heating operation has terminated, the assembly constituted by the tooling 7, 8, the fabric 9, and the backing plate 12 is extracted from the oven 13 and allowed to return to ambient temperature (FIG. 11). The resulting natural cooling causes the pegs 8 to shrink so that they return to their initial size. The backing plate 12 and the fabric 9 as consolidated by the cured resin can then be disengaged from the tooling 7, 8 in succession without difficulty (FIG. 12). Withdrawing the pegs 8 from the cells 90 is not impeded by the resin impregnating the fabric 9 since the anti-adhesive properties of the pegs 8 ensure that the resin does not stick to said pegs.

The fabric 9 is then densified by a carbon matrix in conventional manner, e.g. by chemical vapor infiltration. This provides a honeycomb structure made of carbon-carbon composite material.

Figure 13:
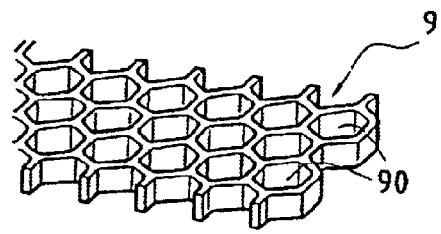
FIGS. 13 and 14 show tooling for manufacturing a honeycomb structure in a second embodiment of the invention.
Figure 13:
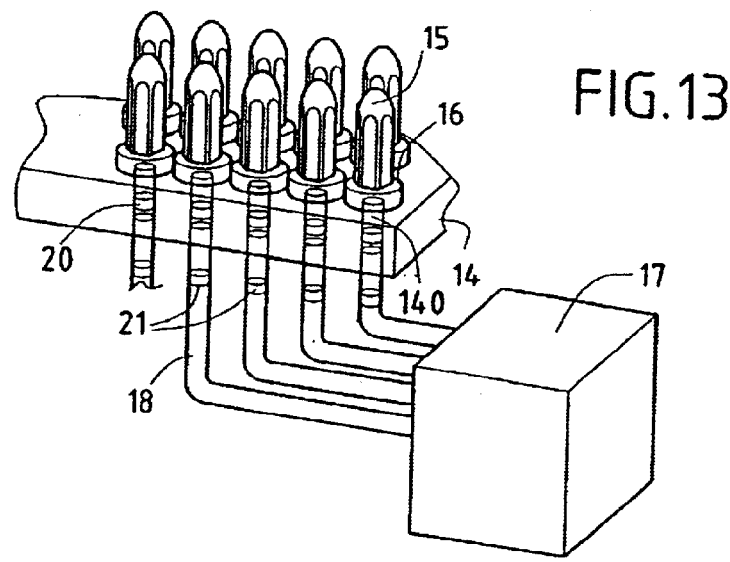
Figure 14:
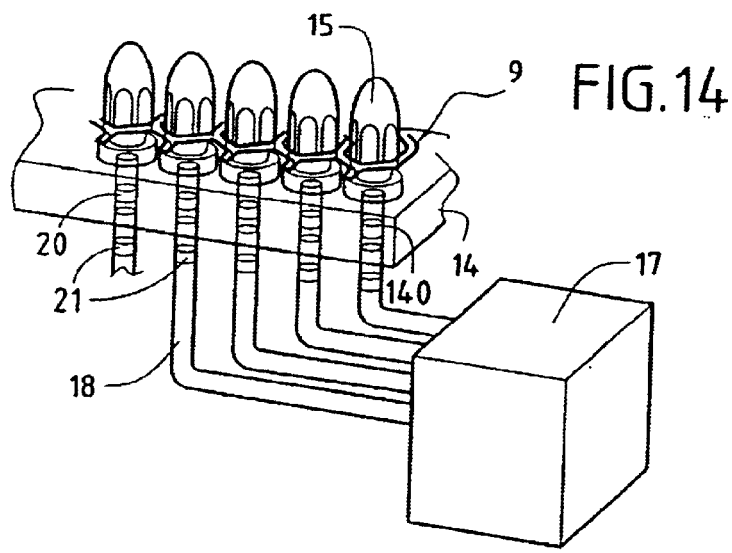

FIGS. 13 and 14 show a second embodiment of the tooling of the invention.

In this second embodiment, the tooling comprises a support plate 14 and pegs in the form of inflatable bladders 15 fixed via bases 16 to the support plate 14. The bases 16 are preferably held slightly loosely to the support plate 14 so that the pegs 15 can move sufficiently relative to the plate, as in the first embodiment.

The inflatable bladders 15 are made of polyurethane, for example. The inside of each inflatable bladder 15 communicates with a pressurized gas generator 17 via the following in succession: an orifice provided through the corresponding base 16; an orifice 140 in the support plate 14; and a duct 18. Valves 20 (shown diagrammatically in FIG. 13), such as check valves controlled by the pressure in the bladders 15, and pressure limiters 21 of the controlled valve type are also provided in the orifices 140 and in the ducts 18, respectively.

The tooling 14, 15, 16 is used in a manner substantially comparable to the tooling 7, 8. The inflatable bladders 15 have an initial cross-sectional size that is smaller than that of the cells 90 so as to ensure they can be inserted easily into the cells. As in the first embodiment, a backing plate (not shown in FIGS. 13 and 14) can be employed so as to hold the fiber fabric 9 relative to the tooling.

In order to fill the cells 90 and exert pressure against their inside faces, the inflatable bladders 15 are expanded by delivering pressurized gas thereto from the generator 17 (FIG. 14). Nevertheless, unlike the first embodiment, this expansion operation is separate from the operation of curing the resin which is implemented only later, by heating the assembly constituted by the tooling together with its expanded bladders 15, the fabric 9, and the backing plate all placed in an oven. More precisely, after the bladders 15 have been expanded, the ducts 18 are separated from the plate 14 and the valves 20 keep the orifices 140 closed so as to maintain the pressurized gas inside the bladders 15. The tooling, the fabric, and the backing plate are then placed in the above-mentioned oven. Once the resin has been cured, the inflatable bladders 15 are deflated by opening the valves 20 in such a manner as to allow the fiber fabric 9 to be separated from the tooling 14, 15, 16.

Figure 15:
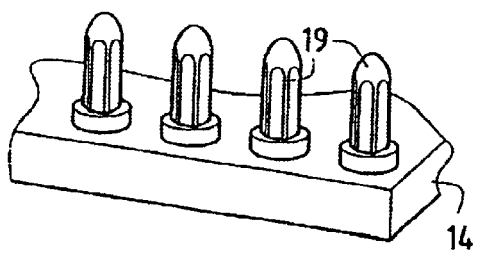
FIG. 15 shows tooling for manufacturing a honeycomb structure in a third embodiment of the invention.

With reference to FIG. 15, pegs constituting a third embodiment are likewise in the form of inflatable bladders 19. However, in this third embodiment, no pressurized gas generator is provided for inflating the bladders 19. The bladders are expanded by thermal expansion of the gas they contain during the stage of curing the resin that impregnates the expanded fabric, as in the first embodiment.

In the invention, as explained above, a resin is preferably used to impregnate the fabric. This resin makes it possible to consolidate the fabric, and it also makes it easier to slide the pegs in the cells of the expanded fabric. Even though it is advantageous to use such a resin, it will nevertheless be clear to the person skilled in the art that it is not essential. In particular, mechanical means could be used for holding the fabric in the deployed condition prior to inserting the pegs into the cells.

Furthermore, the present invention is not limited to making a honeycomb structure out of a carbon-carbon composite material. By way of example, the honeycomb structure of the invention could equally well be made out of a ceramic-ceramic composite material.

What is claimed is:

1. A method of manufacturing a honeycomb structure comprising the steps of:
   a. providing a resin-impregnated fiber fabric having a plurality of staggered honeycomb cells formed through the entire thickness of the fiber fabric,
   b. providing a plurality of expandable pegs mounted on a support plate and projecting substantially perpendicularly to a surface of the support plate, the pegs being mounted loosely on the support plate to allow a limited angular and lateral relative movement of the pegs relative to the support plate,
   c. causing the pegs to simultaneously penetrate each into a respective one of the cells, each peg having a cross-section of size smaller than that of the corresponding cell,
   d. causing the pegs to expand so that they fill the cells and exert pressure on the inside walls of the cells,
   e. curing the resin,
   f. causing the pegs to shrink, and
   d. withdrawing the pegs.

2. A method as claimed in claim 1, wherein, prior to said expanding step, a backing plate is applied against the fiber fabric, the backing plate having through holes in positions that correspond to the cells and to the pegs so as to hold the fiber fabric between the pegs carrying plate and the backing plate.

3. A method as claimed in claim 1, wherein the pegs are expanded by heating them.

4. A method as claimed in claim 3, wherein the pegs are expanded during the step of curing the resin.

5. A method as claimed in claim 3, wherein the pegs are caused to shrink by their natural cooling.

6. A method as claimed in claim 1, wherein the pegs are made of silicone.

7. A method as claimed in claim 1, wherein the pegs are made of metal.

8. A method as claimed in claim 1, wherein the pegs are coated with an anti-adhesive layer.

9. A method as claimed in claim 1, wherein the pegs consist of inflatable bladders each containing gas.

10. A method as claimed in claim 1, wherein the pegs consist of inflatable bladders, and the pegs are expanded by injecting gas under pressure into each of said bladders, and the pegs are shrunk by deflating said bladders.

11. A method as claimed in claim 1, further comprising a step consisting in densifying the fiber fabric after the pegs have been shrunk and withdrawn.

12. A method of manufacturing a honeycomb structure comprising the steps of:
   a. providing a fiber fabric,
   b. impregnating the fiber fabric with a resin,
   c. making parallel cuts in a staggered configuration all through the resin impregnated fiber fabric,
   d. stretching the fabric in a direction parallel to a surface thereof so as to form honeycomb cells in the positions that correspond to the cuts,
   e. causing a plurality of expandable pegs to simultaneously penetrate into respective ones of the cells, each peg having a cross-section of size smaller than that of the corresponding cell, the pegs begin mounted on a support plate and projecting substantially perpendicularly from the support plate, the pegs being mounted loosely on the support plate to allow limited angular and lateral movement of the pegs relative to the support plate,
   f. causing the pegs to expand so that they fill the cells and exert pressure on the inside faces of the cells,
   g. curing the resin,
   h. causing the pegs to shrink, and
   j. withdrawing the pegs.

13. A method of manufacturing a honeycomb structure comprising the steps of:
   a. providing a resin-impregnated fiber fabric having a plurality of staggered honeycomb cells formed through the entire thickness of the fiber fabric,
   b. providing a plurality of expandable pegs mounted on a support plate and projecting substantially perpendicularly from the support plate,
   c. causing the pegs to simultaneously penetrate into respective ones of the cells, each peg having a cross-section of size smaller than that of the corresponding cell,
   d. applying a backing plate against the fiber fabric, the backing plate having through holes in positions that correspond to the cells and to the pegs so as to hold the fiber fabric between the support plate and the backing plate,
   e. causing the pegs to expand so that they fill the cells and exert pressure on the inside walls of the cells,
   f. curing the resin,
   g. causing the pegs to shrink, and
   h. withdrawing the pegs.

* * * * *